(12) United States Patent
Arba Mosquera et al.

(10) Patent No.: US 12,440,382 B2
(45) Date of Patent: Oct. 14, 2025

(54) METHOD FOR CONTROLLING AN EYE SURGICAL LASER, TREATMENT APPARATUS, COMPUTER PROGRAM AS WELL AS COMPUTER-READABLE MEDIUM

(71) Applicant: SCHWIND EYE-TECH-SOLUTIONS GMBH, Kleinostheim (DE)

(72) Inventors: Samuel Arba Mosquera, Aschaffenburg (DE); Mario Shraiki, Ober-Ramstadt (DE); Shwetabh Verma, Aschaffenburg (DE)

(73) Assignee: SCHWIND EYE-TECH-SOLUTIONS GMBH, Kleinostheim (DE)

( * ) Notice: Subject to any disclaimer, the term of this patent is extended or adjusted under 35 U.S.C. 154(b) by 4 days.

(21) Appl. No.: 17/842,393

(22) Filed: Jun. 16, 2022

(65) Prior Publication Data

US 2022/0409434 A1    Dec. 29, 2022

(30) Foreign Application Priority Data

Jun. 25, 2021    (DE) ..................... 10 2021 116 497.4

(51) Int. Cl.
*A61F 9/008*    (2006.01)
*A61D 1/00*    (2006.01)

(52) U.S. Cl.
CPC ...... *A61F 9/00827* (2013.01); *A61F 9/00804* (2013.01); *A61D 1/00* (2013.01);
(Continued)

(58) Field of Classification Search
CPC .............. A61F 9/00827; A61F 9/00804; A61F 2009/00872; A61F 2009/00882
See application file for complete search history.

(56) References Cited

U.S. PATENT DOCUMENTS

2008/0033408 A1\* 2/2008 Bueler ................ A61F 9/00825
606/5
2010/0331831 A1\* 12/2010 Bischoff ............. A61F 9/00804
606/5

(Continued)

OTHER PUBLICATIONS

Simon et al., "Ray Tracing: the Future of Refractive Surgery", Cataract & Refractive Surgery Today, Aug. 2011, pp. 55-56 (Year: 2011).\*

*Primary Examiner* — Lynsey C Eiseman
(74) *Attorney, Agent, or Firm* — MEDLER FERRO WOODHOUSE & MILLS PLLC

(57) ABSTRACT

A method is disclosed for controlling an eye surgical laser for removing a volume body from a cornea with an anterior interface of the cornea and a posterior interface of the cornea. The method includes presetting the posterior actual interface, determining a first imaging point of the cornea, determining an anterior target interface depending on the posterior actual interface and the first imaging point based on a mathematical model, determining a shape of the volume body to be generated by presetting the determined anterior target interface, and generating control data for generating the volume body such that the anterior actual interface corresponds to the determined anterior target interface after removing the volume body from the cornea. Further, the invention relates to a treatment apparatus, to a computer program product as well as to a computer-readable medium.

16 Claims, 2 Drawing Sheets

(52) U.S. Cl.
CPC ............... *A61F 2009/00872* (2013.01); *A61F 2009/00882* (2013.01)

(56) References Cited

U.S. PATENT DOCUMENTS

| | | | |
|---|---|---|---|
| 2014/0128855 A1* | 5/2014 | Wottke | A61F 9/00836 606/5 |
| 2014/0288540 A1* | 9/2014 | Bischoff | A61F 9/008 606/5 |
| 2016/0089270 A1* | 3/2016 | Fu | A61F 9/0084 606/5 |
| 2016/0227996 A1* | 8/2016 | Neal | A61B 3/107 |
| 2017/0143544 A1 | 5/2017 | Holliday et al. | |

\* cited by examiner

METHOD FOR CONTROLLING AN EYE SURGICAL LASER, TREATMENT APPARATUS, COMPUTER PROGRAM AS WELL AS COMPUTER-READABLE MEDIUM

FIELD

The invention relates to a method for controlling an eye surgical laser for removing a volume body from a human or animal cornea of an eye with an anterior interface of the cornea and a posterior interface of the cornea by means of a treatment apparatus and to a method for performing a surgical procedure on a human or animal cornea. Further, the invention relates to a treatment apparatus, to a computer program as well as to a computer-readable medium.

BACKGROUND

Opacities and scars within the cornea, which arise by inflammations, injuries or native diseases, as well as visual disorder such as for example myopia or hyperopia, impair the sight. In particular in case that these pathological and/or unnaturally altered areas of the cornea are located in the axis of vision of the eye, a clear sight is considerably disturbed. In known manner, the thus altered areas are eliminated by a so-called phototherapeutic keratectomy (PTA) by means of an ablatively acting laser, for example an excimer laser. However, this is only possible if the pathological and/or unnaturally altered areas of the cornea are located in the superficial layers of the cornea. Areas located deeper, in particular within the stroma, are not reachable by means of ablative laser methods. Here, additional measures, such as for example the exposure of the areas located deeper by means of an additional corneal incision, have to be taken.

In particular, in order to be able to perform an advantageous treatment on the patient, it is important that it is exactly known how the volume body has to be shaped to be able to perform a corresponding correction of the visual disorder. Such a determination of the shape is very expensive and computationally intensive.

SUMMARY

Therefore, it is the object of the present invention to provide a method and a treatment apparatus for controlling an eye surgical laser for the separation of the volume body from a human or animal cornea, by which the disadvantages of the prior art are overcome.

This object is solved by a method, a method for performing a surgical procedure, a treatment apparatus, a computer program as well as a computer-readable medium according to the independent claims. Advantageous configurations with convenient developments of the invention are specified in the respective dependent claims, wherein advantageous configurations of the method are to be regarded as advantageous configurations of the treatment apparatus, of the computer program and of the computer-readable medium and vice versa.

An aspect of the invention relates to a method for performing a surgical procedure on a human or animal cornea for the separation of a volume body from the cornea and to a method for controlling an eye surgical laser for removing a volume body from a human or animal cornea of an eye with an anterior actual interface of the cornea and a posterior actual interface of the cornea by means of a treatment apparatus. The posterior actual interface is preset depending on at least one preset parameter of the cornea by means of a control device of the treatment apparatus. Determining a first imaging point of the cornea is effected by means of the control device. An anterior target interface is determined depending on the posterior actual interface and the first imaging point based on a mathematical model by means of the control device. A shape of the volume body to be generated is determined by presetting the determined anterior target interface. Generating control data for generating the volume body is effected such that the anterior actual interface corresponds to the determined anterior target interface after removing the volume body from the cornea.

Thereby, it is allowed that the volume body is determined based on the mathematical model such that a corresponding correction or visual disorder of a patient can be reduced or improved and that corresponding diseases or injuries do no longer result in visual defects or result in visual defects only to a low extent after removing the volume body.

Thus, the solution of the problem is in particular in that the anterior target interface is determined based on the posterior actual interface, which has in particular already previously be determined for example by patient data. Then, the anterior actual interface is compared to the anterior target interface and based thereon, the volume to be removed and/or the shape of the volume body are then in turn determined. After removing the volume body, the determined anterior target interface is then in turn be formed by the anterior actual interface.

Thus, the invention in particular deals with the fact that by transforming incoming wave radiation into the cornea, in particular via the anterior interface, outgoing wave radiation, in particular via the posterior interface, can be generated, which in particular in turn focuses on the imaging point, whereby a corresponding correction can be determined. Therein, the first imaging point in particular for example corresponds to a point on the retina of the patient such that the outgoing wavefront is in turn correspondingly adapted for the retina such that the corresponding visual disorder is reduced.

Thus, it is in particular proposed that based on the posterior actual interface and based on an anterior target interface to be determined, the incoming wavefront is altered on the anterior target interface by the cornea such that it corresponds to the preset outgoing wavefront, which is in turn focused on the first imaging point such that the patient can correspondingly optically process the outgoing wavefront.

Therein, the anterior interface can in particular be ascertained based on the parameters $z_a(x_a, y_a)$, wherein the index a in turn corresponds to the coordinates of the input surface. The output surface, thus the posterior actual interface, is in turn described based on the function $z_b(x_b, y_b)$, wherein the index b in turn corresponds to the outgoing surface, thus the posterior interface. Therein, z in particular corresponds to the direction of the incoming optical waves, wherein this direction can also be referred to as optical axis of the eye. Normally, it is substantially rectangular to the input surface, thus the anterior interface. Thus, it is the object to describe the input function, thus the description of the anterior target interface, based on the preset posterior actual interface. Therein, the first imaging point is in particular described by a focal length (f) on the imaging point, such that $z=f_b$ can be written. Further, z is also dependent on a depth (T) or extension length of the cornea, as well as a focal length in front of the eye, which can be described by $f_a$.

By application of the Snell's law, the formulas result:

$$S \equiv \sqrt{z_{b_x}^2 + z_{b_y}^2 + 1}$$

$$D \equiv \sqrt{x_b^2 + y_b^2 + (z_b - f_b)^2}$$

$$L \equiv \sqrt{(x_a - x_b)^2 + (y_a - y_b)^2 + (z_a - z_b)^2},$$

wherein $z_{b\_x}$ corresponds to the partial derivatives at the locations $x_b$ and $y_b$ and $z_{b\_y}$ corresponds to the partial derivative at the location $x_b$. Therein, S and D are only dependent on the output surface, wherein L is dependent both on the input surface and on the output surface. D describes the 3-dimensional distance between an "object point" and a point of impingement on the lens, at which the light beam impinges on the surface of the lens, presently, D is the 3-dimensional distance between retina and the posterior corneal surface. L corresponds to the length of the path of the light beam within the cornea. S corresponds to an auxiliary parameter and indicates the overall slope.

By corresponding separation according to the Cartesian coordinate system, the following formulas arise:

$$X \equiv \frac{x_a - x_b}{L} = \frac{x_b(z_{b_y}^2 + 1) - z_{b_x}(y_b z_{b_y} + f_b - z_b)}{nDS^2} - z_{b_x}\frac{\Phi}{S}$$

$$Y \equiv \frac{y_a - y_b}{L} = \frac{y_b(z_{b_x}^2 + 1) - z_{b_y}(x_b z_{b_x} + f_b - z_b)}{nDS^2} - z_{b_y}\frac{\Phi}{S}$$

$$Z \equiv \frac{z_a - z_b}{L} = \frac{(z_b - f_b)(z_{b_x}^2 + z_{b_y}^2) + x_b z_{b_x} + y_b z_{b_y}}{nDS^2} + \frac{\Phi}{S}$$

Based thereon, the mathematical model can then be created with the formulas:

$$x_a = x_b + \frac{X(z_a - z_b)}{Z}$$

$$y_a = y_b + \frac{Y(z_a - z_b)}{Z}$$

$$z_a = \frac{g - \sqrt{g^2 - h(n^2 - 1)}}{n^2 - 1}$$

with $$g \equiv (z_b - f_a - T)Z^2 + qZ + z_b(n^2 - 1)$$

$$h \equiv [x_b^2 + y_b^2 - z_b^2 + (T - f_a)^2 - (p - nT)^2]Z^2 - 2z_b qZ - z_b^2(n^2 - 1)$$

$$p \equiv -\text{sgn}(f_b)D + f_b - f_a$$

$$q \equiv x_b X + y_b Y - np + n^2 T$$

This mathematical model now analytically describes the shape of the anterior target interface depending on the posterior actual interface. Now, based on this anterior target interface and based on the anterior actual interface, which can in particular also be already preset by the patient information, the shape of the volume body to be removed can be determined. Then, for example based on the difference from the anterior actual interface to the anterior target interface, the volume body can in turn be determined, which has to be removed to get from the anterior actual interface to the anterior target interface.

In particular, the mathematical model is provided such that different results can be mathematically determined, wherein there is physically only a single solution, which corresponds to the Fermat's variation principle, and generate a minimum optical length. This can then in turn be regarded as the solution.

Thus, it is overall proposed that for the preset posterior actual interface and for the wavelength front alteration thereof, respectively, an anterior target interface can be determined, which in turn has to be formed depending on the imaging point on the retina such that the visual disorder can be limited or corrected.

In particular, the position and/or the shape of the volume body are determined such that it can be removed from the stroma of the cornea. In particular, the volume body is to be generated at least below (viewed towards the retina) the epithelium and preferably below the Bowman's membrane. In the shape determination of the volume body, the epithelium and/or the Bowman's membrane are in particular taken into account. Thus, the anterior interface can preferably be regarded as the interface of the stroma adjoining to the Bowman's membrane. The posterior interface can also be regarded as the interface between the stroma and the Dua's layer. Further, an endothelial cell layer can for example also be taken into account.

According to an advantageous form of configuration, in the mathematical model, a second imaging point is preset on a side of the cornea opposing a retina of the eye at a preset distance by means of the control device. In particular, the second imaging point can be determined in front of the eye such that myopia of the patient is for example described. For example, this can be determined such that the patient obtains the second imaging point in a range from 5 to 50 centimeters, in particular between 10 and 40 centimeters, and thus can for example see, for example read, objects in this range.

It is further advantageous if a second imaging point is preset on a side of the cornea opposing the retina at infinity in the mathematical model. In particular, the infinite imaging point can be described as hyperopia. By presetting the second imaging point at infinity, thus, the incoming wavelength front can be described such that hyperopia of the patient is also allowed. In particular, this is indicated in a range from 50 centimeters until substantially infinity.

It is further advantageous if a correction for astigmatism is determined by means of the mathematical model. The term astigmatism is in particular also known as cornea curvature, which has a refractive error of the eye. Thus, it is a visual disorder of the patient. Therein, the incident light beam bundles in particular do not have a focal point on the retina. In order to correct this, the anterior target interface can now be determined such that on the retina, the outgoing wavefront from the posterior interface in turn has a focal point on the retina. Thus, the cornea curvature or the astigmatism can be improved or reduced.

It is further advantageous if a correction for a spherical aberration is determined by means of the mathematical model. In particular, a sharpness error is to be understood by spherical aberration, which is caused by the light refraction of a spherical lens. Therein, the lens again corresponds to the cornea. Therein, the light beams, which are incident through the curved edge area of a lens, are differently refracted compared to those, which are incident through the center of the lens. By determining the anterior target interface depending on the first imaging point, the spherical aberration can in turn be reduced or improved.

In a further advantageous form of configuration, the first imaging point in the eye and a second imaging point at a preset distance in front of the eye, for example at infinity, and a thickness of the cornea and a refractive index (n) of the cornea are taken into account in the mathematical model. In particular, the thickness of the cornea can be labeled as T and the refractive index in particular corresponds to the letter n. Thus, the anterior target interface can be determined in patient-specific manner by the mathematical model. In particular, the thickness of the cornea and the refractive index of the cornea are patient-specific and the anterior target interface can thus be individually determined by considering in the mathematical model such that corresponding individual visual disorders can be reduced or improved.

It is also advantageous if the shape of the volume body is defined by a center of the volume body and/or by a geometric shape of the volume body and/or a diameter of the volume body. Thus, different possibilities can in particular be provided to correspondingly generate the volume body such that the anterior actual interface corresponds to the determined anterior target interface after removing the volume body.

In a further advantageous form of configuration, the shape of the volume body is determined as the volume to be removed by subtraction of the preset determined anterior target interface of the cornea from the anterior actual interface of the cornea. Thus, the volume body shape to be removed can be determined in mathematically simple manner.

It is further advantageous if for determining the anterior target interface, the position of the volume body is selected such that it is removed from the cornea. In particular, different solutions arise in the mathematical model, which would result in a solution of the mathematical model. However, since purely physically viewed, only one volume body can be removed from the cornea and cannot be added thereto, the single solution of the mathematical problem can thus be in the result, which removes the volume body from the cornea. Thus, a single solution can be found to correct the visual disorder.

It is also advantageous if a position of the anterior target interface is determined located deeper than a position of the anterior actual interface viewed in the direction of an optical axis of the eye. In particular, the anterior target interface has to be located deeper than the anterior actual interface. In the solution of the mathematical problem, this can be taken into account such that only a single solution arises, which contributes to the correction of the visual disorder.

In a further advantageous form of configuration, a lenticular volume body is removed from the corneal volume by means of photodisruption or the volume body is removed by means of an ablative method. Thus, the correction can be performed in two different manners and for example also by two differently formed treatment apparatuses.

According to a further advantageous form of configuration, the control of the laser is effected such that the laser emits laser pulses in a wavelength range between 300 nanometers and 1400 nanometers, in particular between 700 nanometers and 1200 nanometers, at a respective pulse duration between 1 fs and 1 ns, in particular between 10 fs and 10 ps, and a repetition frequency of greater than 10 kHz, in particular between 100 kHz and 100 MHz. Such lasers are already used for photodisruptive methods in the eye surgery. The produced lenticule, which corresponds to the volume body, is subsequently removed via an incision in the cornea. The use of photodisruptive lasers in the method according to the invention additionally has the advantage that the irradiation of the cornea is not to be effected in a wavelength range below 300 nm. This range is subsumed by the term "deep ultraviolet" in the laser technology. Thereby, it is advantageously avoided that an unintended damage to the cornea is effected by these very short-wavelength and high-energy beams. Photodisruptive lasers of the type used here usually input pulsed laser radiation with a pulse duration between 1 fs and 1 ns into the corneal tissue. Thereby, the power density of the respective laser pulse required for the optical breakthrough can be spatially narrowly limited such that a high incision accuracy is ensured in the generation of the interfaces.

It is further advantageous if the control of the laser is effected such that topographic and/or pachymetric and/or morphologic data of the cornea is taken into account. Thus, topographic and/or pachymetric measurements of the cornea to be treated as well as the type, the position and the extent of the for example pathological and/or unnaturally altered area within the stroma of the cornea as well as corresponding visual disorders of the eye can in particular be taken into account. Presently, this data in particular corresponds to the preset parameter. In particular, control datasets are generated at least by providing topographic and/or pachymetric and/or morphologic data of the untreated cornea and providing topographic and/or pachymetric and/or morphologic data of the pathological and/or unnaturally altered area to be removed within the cornea or considering corresponding optical corrections for eliminating the visual disorders.

A second aspect of the invention relates to a treatment apparatus with at least one eye surgical laser for the separation of a volume body of a human or animal eye by means of photodisruption or by means of an ablative method and with at least one control device for the laser or lasers, which is formed to execute the steps of the method according to the preceding aspect. The treatment apparatus additionally includes a rotation scanner for predefined deflection of the laser beam of the laser towards the eye to be treated.

Therein, the laser is suitable to emit laser pulses in a wavelength range between 300 nm and 1400 nm, preferably between 700 nm and 1200 nm, at a respective pulse duration between 1 fs and 1 ns, preferably between 10 fs and 10 ps, and a repetition frequency of greater than 10 kHz, preferably between 100 kHz and 100 MHz.

The treatment apparatus can also comprise a plurality, wherein plurality in particular means at least two, of control devices, which then in turn are formed to perform the method according to the invention. The control device or the control devices in particular comprise(s) electronic components like processors, circuits, for example integrated circuits, and further electronic components to be able to perform corresponding method steps.

In an advantageous form of configuration of the treatment apparatus, the treatment apparatus comprises a storage device for at least temporary storage of at least one control dataset, wherein the control dataset or datasets include(s) control data for positioning and/or focusing individual laser pulses in the cornea, and includes at least one beam device for beam guidance and/or beam shaping and/or beam deflection and/or beam focusing of a laser beam of the laser. Therein, the mentioned control datasets are usually generated based on a measured topography and/or pachymetry and/or morphology of the cornea to be treated and/or the type of the pathologically and/or unnaturally altered area to be removed within the cornea and/or the visual disorder of the eye to be corrected.

Further features and the advantages thereof can be taken from the descriptions of the first inventive aspect, wherein advantageous configurations of each inventive aspect are to be regarded as advantageous configurations of the respectively other inventive aspect.

A third aspect of the invention relates to a computer program including commands, which cause the treatment apparatus according to the second inventive aspect to execute the method steps according to the first inventive aspect. A fourth aspect of the invention relates to a computer-readable medium, on which the computer program according to the third inventive aspect is stored. Further features and the advantages thereof can be taken from the descriptions of the first and second inventive aspects, wherein advantageous configurations of each inventive aspect are to be regarded as advantageous configurations of the respectively other inventive aspect.

BRIEF DESCRIPTION OF DRAWINGS

Further features are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

In the figures, identical or functionally identical elements are provided with the same reference characters.

DETAILED DESCRIPTION

Figure 1:
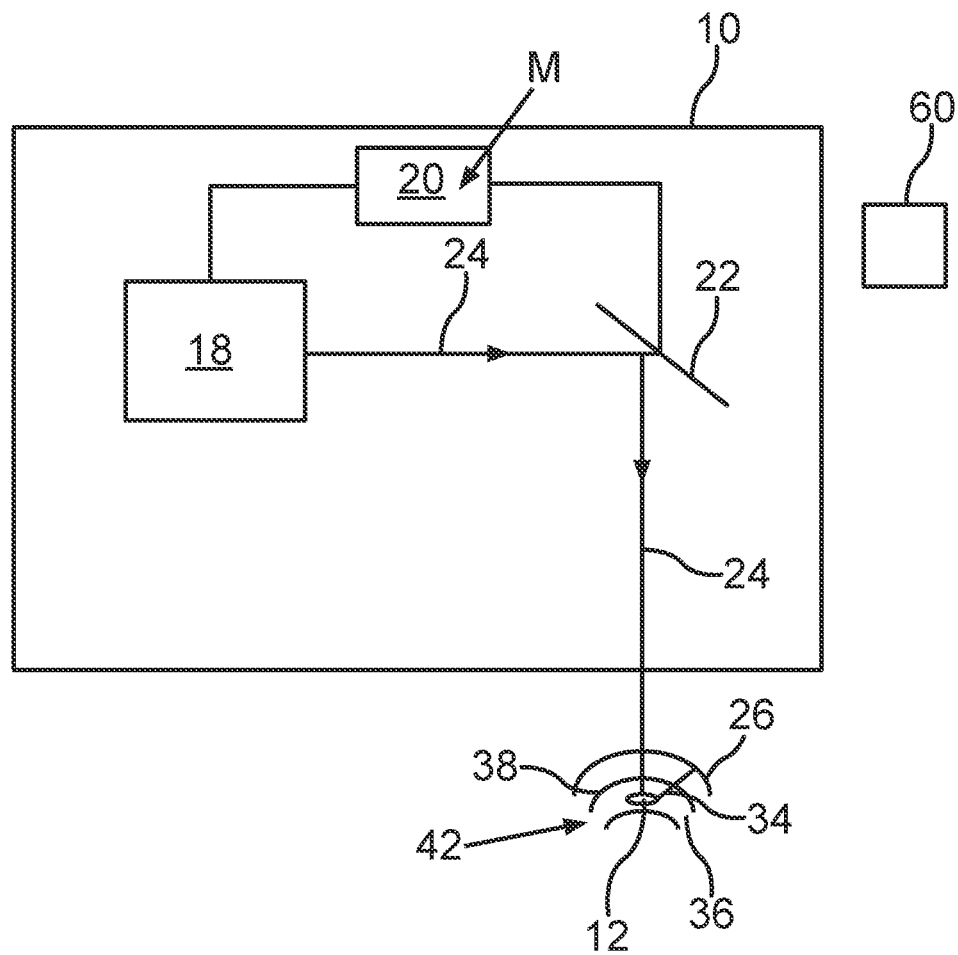
FIG. 1 depicts a schematic side view of an embodiment of a treatment apparatus.

FIG. 1 shows a schematic representation of a treatment apparatus 10 with an eye surgical laser 18 for the separation of a predefined corneal volume or volume body 12. A cornea 44 (FIG. 3) comprises predefined interfaces 14, 16 (FIG. 2), wherein the cornea 44 is in particular that of a human or animal eye 42. The volume body 12 can be generated by means of photodisruption. Alternatively, the volume body 12 can also be removed by means of an ablative method. In particular, a posterior actual interface 14 and an anterior actual interface 16 of the cornea 44 are shown. One recognizes that a control device 20 for the laser 18 is formed besides the laser 18 such that it emits pulsed laser pulses for example in a predefined pattern into the cornea 44, wherein interfaces of the volume body 12 to be separated are generated by the predefined pattern by means of photodisruption. The treatment apparatus 10 can also comprise further control devices. The interfaces of the volume body 12 form a lenticular volume body 12 in the illustrated embodiment, wherein the position of the volume body 12 is selected in this embodiment such that a pathological and/or unnaturally altered area 32 (see FIG. 2), for example a visual disorder, within a stroma 36 of the cornea 44 is enclosed.

Furthermore, it is apparent from FIG. 1 that the so-called Bowman's membrane 38 is formed between the stroma 36 and an epithelium 28.

Furthermore, one recognizes that the laser beam 24 generated by the laser 18 is deflected towards a surface 26 of the cornea by means of a beam device 22, namely a beam deflection device, such as for example a rotation scanner. The beam deflection device is also controlled by the control device 20 to generate the mentioned predefined pattern in the cornea.

The illustrated laser 18 is a photodisruptive laser or a laser, which is formed to emit laser pulses in a wavelength range between 300 nm and 1400 nm, preferably between 700 nm and 1200 nm, at a respective pulse duration between 1 fs and 1 ns, preferably between 10 fs and 10 ps, and a repetition frequency of greater than 10 kHz, preferably between 100 kHz and 100 MHz. Alternatively, the laser 18 can also be formed for removing the volume body 12 by an ablative method.

In addition, the control device 20 comprises a storage device (not illustrated) for at least temporary storage of at least one control dataset, wherein the control dataset or datasets include(s) control data for positioning and/or for focusing individual laser pulses in the cornea 44. The position data and/or focusing data of the individual laser pulses are generated based on a previously measured topography and/or pachymetry and/or the morphology of the cornea and the pathological and/or unnaturally altered area 32 for example to be removed or the optical visual disorder correction to be generated within the stroma 36 of the eye 42. Further, data, such as for example the shape and the position, of the posterior actual interface 14 of the cornea 44 and of the anterior actual interface 16 of the cornea 44 is also determined. Below, this data is also referred to as preset parameter.

Figure 2:
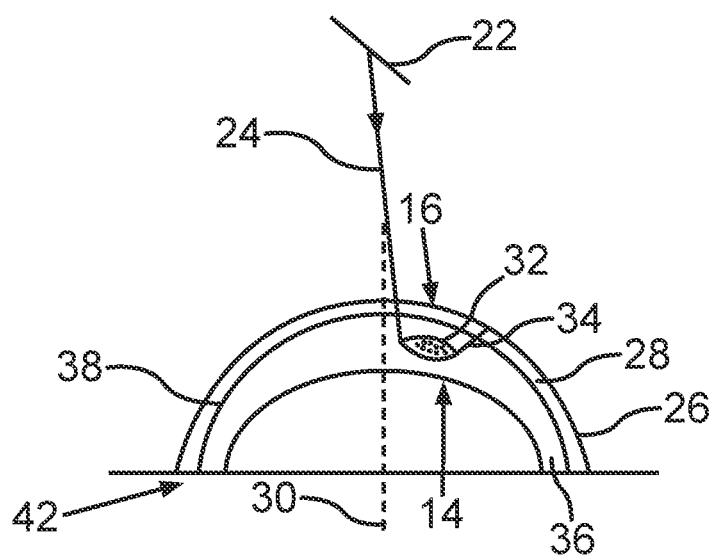
FIG. 2 depicts a further schematic side view of an embodiment of a treatment apparatus.

FIG. 2 shows a schematic diagram of the generation of the volume body 12 to be separated according to an embodiment of the present method. One recognizes that the interfaces of the volume body 12 are generated by means of the pulsed laser beam 24, which is directed towards the cornea 44 or towards the surface 26 of the cornea 44 via the beam deflection device 22. Therein, the interfaces of the volume body 12 form a lenticular volume body 12, which for example encloses the pathological and/or unnaturally altered area 32 within the stroma 36. Furthermore, the laser 18 generates a further incision 34 in the illustrated embodiment, which intersects the volume body 12 at a predefined angle and with a predefined geometry and is formed up to the surface 26 of the cornea 44. The volume body 12 defined by the interfaces can then be removed from the cornea 44 via the incision 34. In the illustrated embodiment, the pathological and/or unnaturally altered area 32 is formed within the stroma 36 and outside of an optical axis 30 of the eye 42.

In the illustrated embodiment, the interface located deeper, that is the interface of the volume body 12 located deeper in the eye 42 and the stroma 36, respectively, can first be generated by means of the laser beam 24. This can be effected by at least partially circularly and/or spirally guiding the laser beam 24 according to the predefined pattern. Subsequently, the interface of the volume body 12 located higher is generated in comparable manner such that the interfaces form the lenticular volume body 12. Subsequently, the incision 34 is also generated by the laser 18. However, the order of the generation of the interfaces of the volume body 12 and of the incision 34 can also be changed.

Figure 3:
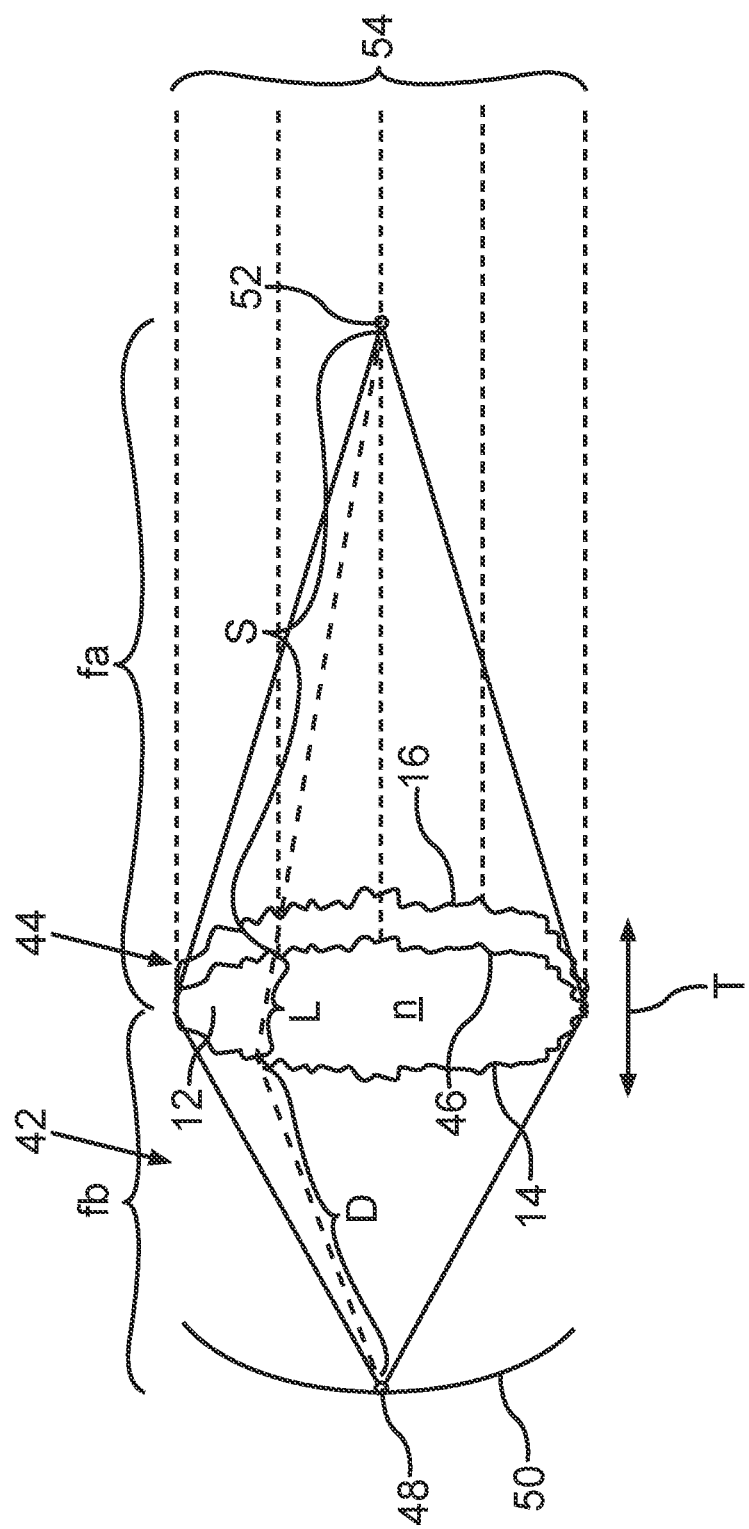
FIG. 3 depicts a schematic sectional view of an eye.

FIG. 3 shows a schematic sectional view according to an embodiment of the method. In particular, a sectional view of the eye 42 is shown. FIG. 3 shows the eye 42 with the posterior actual interface 14 as well as the anterior actual interface 16. Further, it is shown that an anterior target interface 46 is to be achieved and determined, respectively.

Thus, FIG. 3 shows that the posterior actual interface 14 is preset depending on at least one preset parameter of the cornea 44 by means of the control device 20. Determining a first imaging point 48, which is in particular located on a retina 50 of the eye 42, is effected by means of the control device 20. Then, determining the anterior target interface 46 depending on the posterior actual interface 14 and the first imaging point 48 is performed based on a mathematical model M by means of the control device 20. Subsequently, determining a shape of the volume body 12 to be generated is effected by presetting the determined anterior target interface 46. Subsequently thereto, the control data for generating the volume body 12 is determined such that the anterior actual interface 16 corresponds to the determined anterior target interface 46 after removing the volume body 12 from the cornea 44.

In particular, it is provided that the posterior actual interface 14 and the anterior actual interface 16 are determined based on topographic and/or pachymetric and/or morphologic data of the cornea 44 of the eye 42 and/or of a lens of the eye 42.

Further, it is in particular shown that the shape of the volume body 12 is determined as the volume to be removed by subtraction of the preset determined anterior target interface 46 from the anterior actual interface 16 of the cornea 44.

FIG. 3 further shows that in the mathematical model M, a second imaging point 52, 54 is preset on the side of the cornea 44 opposing the retina 50 of the eye 42 at a preset distance by means of the control device 20, wherein this presently in particular corresponds to the second imaging point 52. Further, the second imaging point 52, 54 can also be preset at infinity in front of the eye 42, wherein this is in particular represented by the reference character 54.

In particular, a correction for an astigmatism and/or a correction for a spherical aberration can be determined by means of the mathematical model M. In particular, the first imaging point 48 in the eye 42, the second imaging point 52, 54 at a preset distance in front of the eye 42, a thickness T of the cornea 44 and a refractive index n of the cornea 44 are taken into account by the mathematical model M.

Therein, the anterior interface, in particular the anterior target interface 46, can in particular be ascertained based on the parameters $z_a(x_a, y_a)$, wherein the index a in turn corresponds to the coordinates of the input surface. The output surface, thus the posterior actual interface 14, is in turn described based on the function $z_b(x_b, y_b)$, wherein the index b in turn stands for the outgoing surface, thus the posterior interface. Therein, z in particular corresponds to the direction of the incoming optical waves, wherein this direction can also be referred to as optical axis 30 of the eye 42. It is normally substantially rectangular to the input surface, thus the anterior interface. Thus, it is the object to describe the input function, thus the description of the anterior target interface 46, based on the preset posterior actual interface 14. Therein, the first imaging point 48 is in particular described by a focal length (f) on the imaging point such that $z=f_b$ can be written. Further, z is also dependent on a depth (T) or extension length of the cornea 44, as well as a focal length in front of the eye 42, which can be described by $f_a$.

By application of the Snell's law, the formulas result:

$$S \equiv \sqrt{z_{b_x}^2 + z_{b_y}^2 + 1}$$

$$D \equiv \sqrt{x_b^2 + y_b^2 + (z_b - f_b)^2}$$

$$L \equiv \sqrt{(x_a - x_b)^2 + (y_a - y_b)^2 + (z_a - z_b)^2},$$

wherein $z_{b_x}$ corresponds to the partial derivatives at the locations $x_b$ and $y_b$ and $z_{b_y}$ corresponds to the partial derivative at the location $x_b$. Therein, S and D are only dependent on the output surface, wherein L is dependent both on the input surface and on the output surface. D describes the 3-dimensional distance between an "object point" and a point of impingement on the lens, at which the light beam impinges on the surface of the lens, presently, D is the 3-dimensional distance between retina 50 and the posterior corneal surface, thus the posterior actual interface 14. L corresponds to the length of the path of the light beam within the cornea 44. S corresponds to an auxiliary parameter and indicates the overall slope.

By corresponding separation according to the Cartesian coordinate system, the following formulas arise:

$$X \equiv \frac{x_a - x_b}{L} = \frac{x_b(z_{b_y}^2 + 1) - z_{b_x}(y_b z_{b_y} + f_b - z_b)}{nDS^2} - z_{b_x}\frac{\Phi}{S}$$

$$Y \equiv \frac{y_a - y_b}{L} = \frac{y_b(z_{b_x}^2 + 1) - z_{b_y}(x_b z_{b_x} + f_b - z_b)}{nDS^2} - z_{b_y}\frac{\Phi}{S}$$

$$Z \equiv \frac{z_a - z_b}{L} = \frac{(z_b - f_b)(z_{b_x}^2 + z_{b_y}^2) + x_b z_{b_x} + y_b z_{b_y}}{nDS^2} + \frac{\Phi}{S}$$

Based thereon, the mathematical model M can then be created with the formulas:

$$x_a = x_b + \frac{X(z_a - z_b)}{Z}$$

$$y_a = y_b + \frac{Y(z_a - z_b)}{Z}$$

$$z_a = \frac{g - \sqrt{g^2 - h(n^2 - 1)}}{n^2 - 1}$$

with $$g \equiv (z_b - f_a - T)Z^2 + qZ + z_b(n^2 - 1)$$

$$h \equiv (x_b^2 + y_b^2 - z_b^2 + T - f_a)^2 - (p - nT)^2]Z^2 - 2z_n qZ - z_b^2(n^2 - 1)$$

$$h \equiv -\mathrm{sgn}(f_b)D + f_b - f_a$$

$$q \equiv x_b x + y_b Y - np + n^2 T$$

Now, this mathematical model M analytically describes the shape of the anterior target interface 46 depending on the posterior actual interface 14. Based on this anterior target interface 46 and based on the anterior actual interface 16, which can in particular also be already preset by the patient information, the shape of the volume body 12 to be removed can now be determined. Then, for example based on the difference from the anterior actual interface 16 to the anterior target interface 46, the shape of the volume body 12 can in turn be determined, which has to be removed to get from the anterior actual interface 16 to the anterior target interface 46.

Further, FIG. 3 in particular shows that the shape of the volume body 12 is defined by a center of the volume body 12 and/or by a geometric shape of the volume body 12 and/or by a diameter of the volume body 12.

Furthermore, it is in particular provided that for determining the anterior target interface 46, the position of the volume body 12 is selected such that it is removed from the cornea 44. Further, a position of the anterior target interface 46 is in particular determined located deeper than a position of the anterior actual interface 16 viewed in the direction of an optical axis 30 of the eye 42.

Further, a lenticular volume body 12 can in particular be removed from the corneal volume by means of photodisruption or the volume body 12 can be removed based on an ablative method.

What is claimed is:

1. A method for controlling an eye surgical laser for removing a volume body from a human or animal cornea of an eye with an anterior actual interface of the cornea and a posterior actual interface of the cornea by means of a treatment apparatus, comprising the steps of:
presetting the posterior actual interface depending on at least one preset parameter of the cornea by means of a control device of the treatment apparatus;
determining a first imaging point of the cornea by means of the control device;
generating a mathematical model of an anterior target interface based on the posterior actual interface and the following equations:

$$x_a = x_b + \frac{X(z_a - z_b)}{Z}$$

$$y_a = y_b + \frac{Y(z_a - z_b)}{Z}$$

$$z_a = \frac{g - \sqrt{g^2 - h(n^2 - 1)}}{n^2 - 1}$$

$$X = \frac{x_a - x_b}{L}$$

wherein $Y = \frac{y_a - y_b}{L}$ $$Z = \frac{z_a - z_b}{L}$$

with $g = (z_b - f_a - T)Z^2 + qZ + z_b(n^2 - 1)$ $h = [x_b^2 + y_b^2 - z_b^2 + (T - f_a)^2 - (p - nT)^2]Z^2 - 2z_b qZ - z_b^2(n^2 - 1)$ $p = -\text{sgn}(f_b)D + f_b - f_a$ $q = x_b X + y_b Y - np + n^2 T$ wherein $x_a$ is an x-coordinate of an input surface, $x_b$ is an x-coordinate of an outgoing surface, $y_a$ is a y-coordinate of the input surface, $y_b$ is a y-coordinate of the outgoing surface, $z_a$ is a direction of incoming waves on the input surface, $z_b$ is a direction of outgoing waves on the outgoing surface, n is a refractive index of the cornea, $f_a$ is a focal length in front of the eye, $f_b$ is a focal length of the first imaging point, T is a depth of the cornea, L corresponds to a length of a path of a light beam within the cornea, and D is a 3-dimensional distance between a retina and a posterior corneal surface, wherein the mathematical model is a generated mathematical model of an incoming wavefront on the anterior target interface, the anterior target interface corresponds to a specified outgoing wavefront, which in turn is focused on the first imaging point based on the posterior actual interface and the generated mathematical model of the anterior target interface;
determining a shape of the volume body to be generated based on a difference between the anterior actual interface to the anterior target interface;
generating control data for generating the volume body such that the anterior actual interface corresponds to the generated mathematical model of the anterior target interface after removing the volume body from the cornea; and
controlling the eye surgical laser to remove the volume body based on the control data.

2. The method according to claim 1, wherein in the generated mathematical model, a second imaging point is preset on a side of the cornea opposing the retina of the eye at a preset distance by means of the control device.

3. The method according to claim 1, wherein in the generated mathematical model, a second imaging point is preset on a side of the cornea opposing a retina of the eye at infinity.

4. The method according to claim 1, wherein a correction for an astigmatism is determined by means of the generated mathematical model.

5. The method according to claim 1, wherein a correction for a spherical aberration is determined by means of the generated mathematical model.

6. The method according to claim 1, wherein the first imaging point in the eye and a second imaging point at a preset distance in front of the eye are taken into account in the generated mathematical model.

7. The method according to claim 1, wherein the shape of the volume body is defined by a center of the volume body and/or by a geometric shape of the volume body and/or a diameter of the volume body.

8. The method according to claim 1, wherein the shape of the volume body is determined as the volume to be removed by subtraction of the preset, determined anterior target interface of the cornea from the anterior actual interface of the cornea.

9. The method according to claim 1, wherein for determining the anterior target interface, a position of the volume body is selected such that it is removed from the cornea.

10. The method according to claim 1, wherein when viewed in a direction of an optical axis of the eye, a position of the anterior target interface is determined to be located deeper than a position of the anterior actual interface.

11. The method according to claim 1, wherein a lenticular volume body is removed from the cornea by means of photodisruption or that the volume body is removed by means of an ablative method.

12. The method according to claim 1, wherein the control of the eye surgical laser is effected such that the laser emits laser pulses in a wavelength range between 100 nm and 1400 nm, or between 700 nm and 1200 nm, at a respective pulse duration between 1 fs and 20 ns, or between 10 fs and 10 ps, and a repetition frequency of greater than 1 kHz, or between 100 kHz and 10 MHz.

13. The method according to claim 1, wherein for determining the posterior actual interface and/or for determining the anterior actual interface and/or for determining the shape of the volume body, topographic and/or pachymetric and/or morphologic data of the cornea of the eye and/or of a lens of the eye is taken into account.

14. A treatment apparatus with at least one eye surgical laser and with at least one control device for the laser or lasers, which is formed to perform the steps of the method according to claim 1.

15. The treatment apparatus according to claim 14, wherein the control device comprises:
- at least one storage device for at least temporary storage of:
  - at least one control dataset including control data for positioning and/or for focusing a laser beam into the eye; and
  - the generated mathematical model for generating the control data; and
- at least one beam device for beam guidance and/or beam shaping and/or beam deflection and/or beam focusing of a laser beam of the laser.

16. A non-transitory computer-readable medium, for storing a computer program, wherein the computer program includes commands, which cause a treatment apparatus with at least one eye surgical laser and with at least one control device for the at least one eye surgical laser to execute the method steps according to claim 1.

* * * * *